United States Patent
Sokawa et al.

[11] Patent Number: 5,986,716
[45] Date of Patent: Nov. 16, 1999

[54] TELEVISION RECEIVER AND SIGNAL PROCESSING APPARATUS

[75] Inventors: Kenta Sokawa, Hirakatashi; Yoichiro Miki, Kawachinaganosi; Takashi Yamaguchi, Ibarakishi, all of Japan

[73] Assignee: Matsushita Electric Industrial Co., Ltd., Japan

[21] Appl. No.: 08/805,806

[22] Filed: Feb. 25, 1997

[30] Foreign Application Priority Data

Mar. 4, 1996 [JP] Japan ................................ 8-046019

[51] Int. Cl.⁶ ........................................................... H04N 5/44
[52] U.S. Cl. ............................ 348/553; 348/571; 348/725
[58] Field of Search .................................... 348/553, 554,
348/555, 556, 558, 552, 571, 725, 726,
727, 728, 384, 720, 575, 706; H04N 5/44

[56] References Cited

U.S. PATENT DOCUMENTS

| | | | |
|---|---|---|---|
| 4,356,475 | 10/1982 | Neuman | 340/521 |
| 5,459,526 | 10/1995 | Yamada | 348/555 |
| 5,486,868 | 1/1996 | Shyu et al. | 348/524 |
| 5,557,675 | 9/1996 | Shupak | 380/10 |
| 5,598,227 | 1/1997 | Mikami | 348/725 |
| 5,699,125 | 12/1997 | Rzeszewski et al. | 348/563 |
| 5,734,425 | 3/1998 | Takizawa et al. | 348/231 |

FOREIGN PATENT DOCUMENTS

| | | |
|---|---|---|
| 0 447 167 A2 | 9/1991 | European Pat. Off. . |
| 0 529 442 A2 | 3/1993 | European Pat. Off. . |
| 0 574 901 A2 | 12/1993 | European Pat. Off. . |
| 0 574 902 A2 | 12/1993 | European Pat. Off. . |
| 0 643 354 A1 | 3/1995 | European Pat. Off. . |
| WO 96/01021 | 1/1996 | WIPO . |

*Primary Examiner*—John K. Peng
*Assistant Examiner*—Wesner Sajous
*Attorney, Agent, or Firm*—Parkhurst & Wendel, L.L.P.

[57] ABSTRACT

A television receiver (a signal processing apparatus) equipped with a microprocessor unit, wherein a high speed processing, such as video decoding, is performed by a programmable operation circuit, and a low speed processing, such as control processing, synchronous processing, or deflection processing, is performed by the microprocessor unit.

8 Claims, 9 Drawing Sheets

Fig.4

| operation element | NTSC decoding process | MUSE decoding process |
|---|---|---|
| PE11<br>12<br>13<br>⋮ | Y/C separation | still picture region interpolation |
| 1n | inverse matrix process | inverse matrix process |
| 21<br>22<br>23 | ACC<br>color demodulation | moving picture region interpolation |
| ⋮ | filtering | |
| 2n | inverse matrix process | inverse matrix process |
| 31<br>32<br>33<br>⋮ | | motion detection |
| 3n | inverse matrix process | inverse matrix process |
| <br>m1<br>m2<br>m3<br>⋮<br>mn | | alternated line decoding |

TELEVISION RECEIVER AND SIGNAL PROCESSING APPARATUS

BACKGROUND OF THE INVENTION

1. Field of the Invention

The present invention relates to a television receiver and a signal processing apparatus, both for processing a video signal using a programmable operation unit and a microprocessor unit (hereinafter referred to as MPU).

2. Description of the Prior Art

In recent years, broadcasting systems have been diversified and, at present, not only conventional NTSC television broadcasting utilizing a ground wave but also high-definition television broadcasting utilizing a broadcasting satellite (hereinafter referred to as BS) are put to practical use. With the diversification of broadcasting systems, television receivers are required to have the ability to receive various broadcasts.

FIG. 9 is a block diagram illustrating a television receiver receiving a conventional NTSC system television broadcast using a ground wave, an NTSC broadcast using a BS, and a high-definition television broadcast using a BS.

First of all, the operation of the television receiver to receive the ground wave television broadcast will be described.

A conventional television broadcasting wave, i.e., a ground wave, received by an antenna 10 is input to a V/UHF tuner, wherein a desired channel signal is selected and converted into an intermediate frequency signal. Thereafter, the intermediate frequency signal is amplified by an intermediate frequency amplifier 12, converted into a base band NTSC signal by a VSB demodulator 13, and supplied to a selector circuit 24. In the selector circuit 24, the base band NTSC signal from the VSB demodulator 13 is selected, and this signal is input to a synchronous processing circuit 15 and an AD converter 14. In the NTSC system, the sampling frequency of the AD converter 14 is usually four times as high as a color subcarrier, and it is about 14.3 MHz. The base band NTSC signal digitized by the AD converter 14 is supplied to an NTSC decoder circuit 16, wherein the signal is subjected to the NTSC decoding process, such as luminance signal/chrominance signal separation, color demodulation, and inverse matrix processing. As a result of the NTSC decoding process, RGB signals are output from the decoder circuit 16. These RGB signals are converted into analog signals by a DA converter 17, selected in a selector circuit 20, transmitted through a driver circuit 21 to a CRT 22, and displayed as a video image.

On the other hand, in the synchronous processing circuit 15, a horizontal synchronous signal and a vertical synchronous signal are reproduced from the input base band NTSC signal, and a clock signal synchronous with the input signal is produced. The synchronous signals and the clock signal are input to the NTSC decoder circuit 16, the AD converter 14, the DA converter 17, and a deflection processing circuit 18, and these circuits are operated according to these signals.

The deflection processing circuit 18 generates a deflection control signal on the basis of the synchronous signals from the synchronous processing circuit 15. The deflection control signal is a sawtooth waveform signal for horizontal and vertical deflections, and this signal is selected in a selector circuit 23 and controls deflection of the CRT 22.

A description is now given of the operation of the television receiver to receive a high-definition television signal. High-definition television broadcasting currently being put to practical use employs MUSE (Multiple Sub-Nyquist Sampling Encoding) system which is described by Ninomiya et al. in MD-TV Broadcasting System Using Single Channel Satellite (MUSE), Technical Report of Television Society TEBS 95-2, Vol.7, No. 44. In this system, a broad-band and high-definition video signal is subjected to 4:1 sub-nyquist sampling which makes one round by four fields, whereby the video signal is compressed to about ¼. Employing the MUSE system, FM (Frequency Modulation) satellite broadcasting is implemented.

Initially, a high-definition television broadcasting wave received by an antenna 30 is input to a BS tuner 31, wherein a desired channel signal is selected and converted into an intermediate frequency signal. Thereafter, the intermediate frequency signal is amplified by an intermediate frequency amplifier 32 and supplied to an FM demodulator 33. A base band MUSE signal output from the FM demodulator 33 is subjected to sampling at 16.2 MHz by an AD converter 34, and supplied to an MUSE decoder circuit 36 and a synchronous processing circuit 35.

In the MUSE decoder circuit 36, the original broad-band high-definition video signal is reproduced by approximately interpolating sampling point information which has not been transmitted, using intra-field, inter-field, or inter-frame interpolation. The high-definition video signal so reproduced is output as an RGB signal. The RGB signal is converted into an analog signal by a DA converter 37, selected in the selector circuit 20, transmitted through the driver circuit 21 to the CRT 22, and displayed as a video image.

On the other hand, in the synchronous processing circuit 35, a horizontal synchronous signal and a vertical synchronous signal are reproduced from the input base band MUSE signal, and a clock signal and a control signal, which are required for the operation of the MUSE decoder circuit 36, are produced. The synchronous signals, the clock signal, and the control signal are input to the MUSE decoder circuit 36, the AD converter 34, the DA converter 37, and a deflection processing circuit 38, and these circuits are operated according to these signals.

The deflection processing circuit 38 generates a deflection control signal on the basis of the synchronous signals from the synchronous processing circuit 35. The deflection control signal is a sawtooth waveform signal for horizontal and vertical deflections, and this signal is selected in the selector circuit 23 and controls the deflection of the CRT 22.

It is well known that, in satellite broadcasting, not only the high-definition television broadcasting using the MUSE system but also the conventional television broadcasting using the NTSC system are implemented. In this case, the selector circuit 24 shown in FIG. 9 selects a base band NTSC signal output from the FM demodulator 33, and this signal is subjected to the same NTSC decoding process as described above for the ground wave broadcasting.

As described above, the prior art television receiver for both the high-definition television broadcasting and the conventional television broadcasting is equipped with individual processing circuits for the respective broadcasting systems, i.e., the decoder circuits 16 and 36, the synchronous processing circuits 15 and 35, and the deflection processing circuits 18 and 38, as shown in FIG. 9, resulting in an increase in the circuit scale of the television receiver and an increase in the cost.

SUMMARY OF THE INVENTION

It is an object of the present invention to provide a television receiver that can process signals of different broadcasting systems using a single signal processing circuit by only changing a program to realize a considerable cost reduction.

It is another object of the present invention to provide a signal processing apparatus that can process signals of different broadcasting systems by only changing a program to realize a considerable cost reduction.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a television receiver comprises a memory containing a microprogram that specifies a video decoding process algorithm; programmable operation means receiving a video signal and executing the video decoding process according to the microprogram; and a microprocessor unit controlling transmission of the microprogram contained in the memory to the programmable operation means; wherein a high speed process is performed using the programmable operation means while a low speed process is performed using the microprocessor unit.

According to a second aspect of the present invention, a signal processing apparatus comprises a memory containing a microprogram that specifies a video decoding process algorithm; programmable operation means receiving a video signal and executing the video decoding process according to the microprogram; and a microprocessor unit controlling transmission of the microprogram contained in the memory to the programmable operation means; wherein a high speed process is performed using the programmable operation means while a low speed process is performed using the microprocessor unit.

In the structure mentioned above, a high speed process, such as the video decoding process, is performed by the programmable operation means according to the procedure written in the microprogram. Further, a low speed process, such as programmable operation means control processing, synchronous processing, or deflection processing, is performed by the microprocessor unit. In this way, the television receiver (signal processing apparatus) can process signals of various broadcasting systems, using a single signal processing circuit, by only changing the program. Therefore, the circuit scale is reduced, resulting in a considerable cost reduction.

BRIEF DESCRIPTION OF THE DRAWINGS

FIG. 4 is a diagram illustrating allocation of processes to the respective operation elements.

DESCRIPTION OF THE PREFERRED EMBODIMENTS

Figure 1:
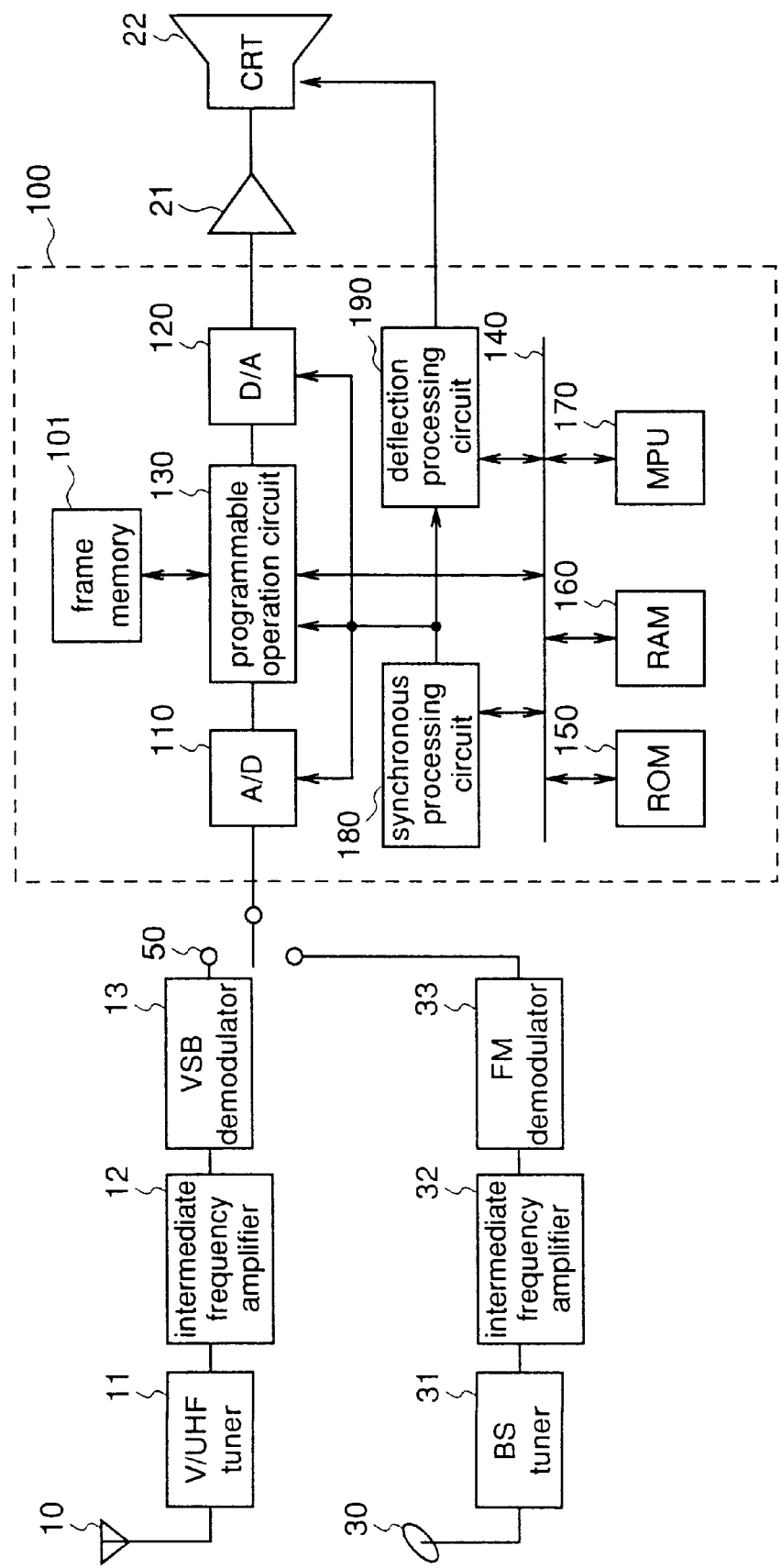
FIG. 1 is a block diagram illustrating a television receiver according to an embodiment of the present invention.

FIG. 1 is a block diagram illustrating a television receiver according to an embodiment of the present invention.

First of all, the operation of the television receiver to receive a conventional television broadcast will be described. A conventional television broadcasting wave, i.e., a ground wave, received by an antenna 10 is input to a V/UHF tuner 11, wherein a desired channel signal is selected and converted into an intermediate frequency signal. Thereafter, the intermediate frequency signal is amplified by an intermediate frequency amplifier 12, demodulated to a base band NTSC signal by a VSB demodulator 13, and supplied to a selector circuit 50.

Next, a description is given of the operation of the television receiver to receive a BS high-definition television broadcast. As already described in [Description of the Prior Art], high-definition television broadcasting currently being put to practical use in Japan employs the MUSE system. Initially, a satellite broadcasting wave received by an antenna 30 is input to a tuner 31, wherein a desired channel signal is selected and converted into an intermediate frequency signal. Then, the intermediate frequency signal is amplified by an intermediate frequency amplifier 32, demodulated to a base band MUSE signal by an FM demodulator 33, and supplied to the selector circuit 50.

Furthermore, in satellite broadcasting, not only the MUSE system high-definition television broadcasting but also the conventional NTSC system television broadcasting are implemented. In this case, a base band NTSC signal is output from the FM demodulator 33 and supplied to the selector circuit 50.

In the selector circuit 50, a desired base band signal is selected, and this base band signal is supplied to a signal processing unit 100.

The signal processing unit 100 is equipped with an AD converter 110 on the signal input side and a DA converter 120 on the signal output side. Further, the unit 100 includes a programmable operation circuit 130, a synchronous processing circuit 180, a deflection processing circuit 190, an MPU (Microprocessor Unit) 170, a RAM (Random Access Memory) 160, and a ROM (Read Only Memory) 150, which are connected each other through a bus 140.

The base band signal (the base band NTSC signal or the base band MUSE signal) input to the signal processing unit 100 is converted into a digital signal by the AD converter 110, and supplied to the programmable operation circuit 130.

Figure 2:
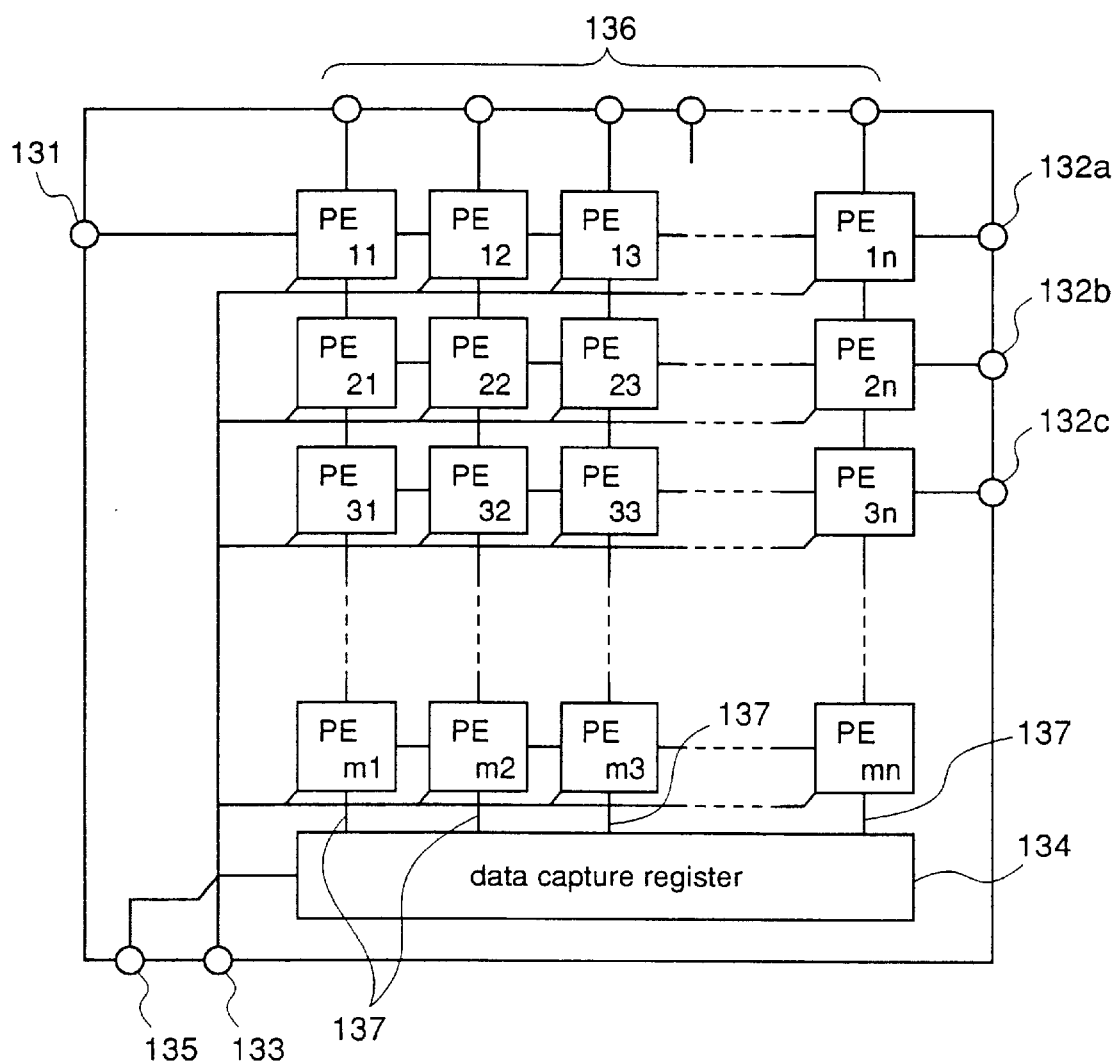
FIG. 2 is a block diagram illustrating a programmable operation circuit included in the television receiver shown in FIG. 1.

FIG. 2 shows the internal structure of the programmable operation circuit 130. The programmable operation circuit 130 comprises a plurality of operation elements $PE_{11}$ to $PE_{mn}$ arranged in an array, and a data capture register 134. Each operation element and the data capture register 134 are connected through an I/O port 133 to the MPU 170 or the ROM 150 with the bus 140, and connected through an input terminal 135 to the synchronous processing circuit 180.

Each operation element is a circuit capable of changing the process content by changing the microprogram. The operational procedure is written in the ROM 150 as a microprogram, and the microprogram is loaded into each element according to a load instruction from the MPU 170. A control signal applied to the input terminal 135 controls loading of the microprogram, and start and stop of the operation.

Figure 3:
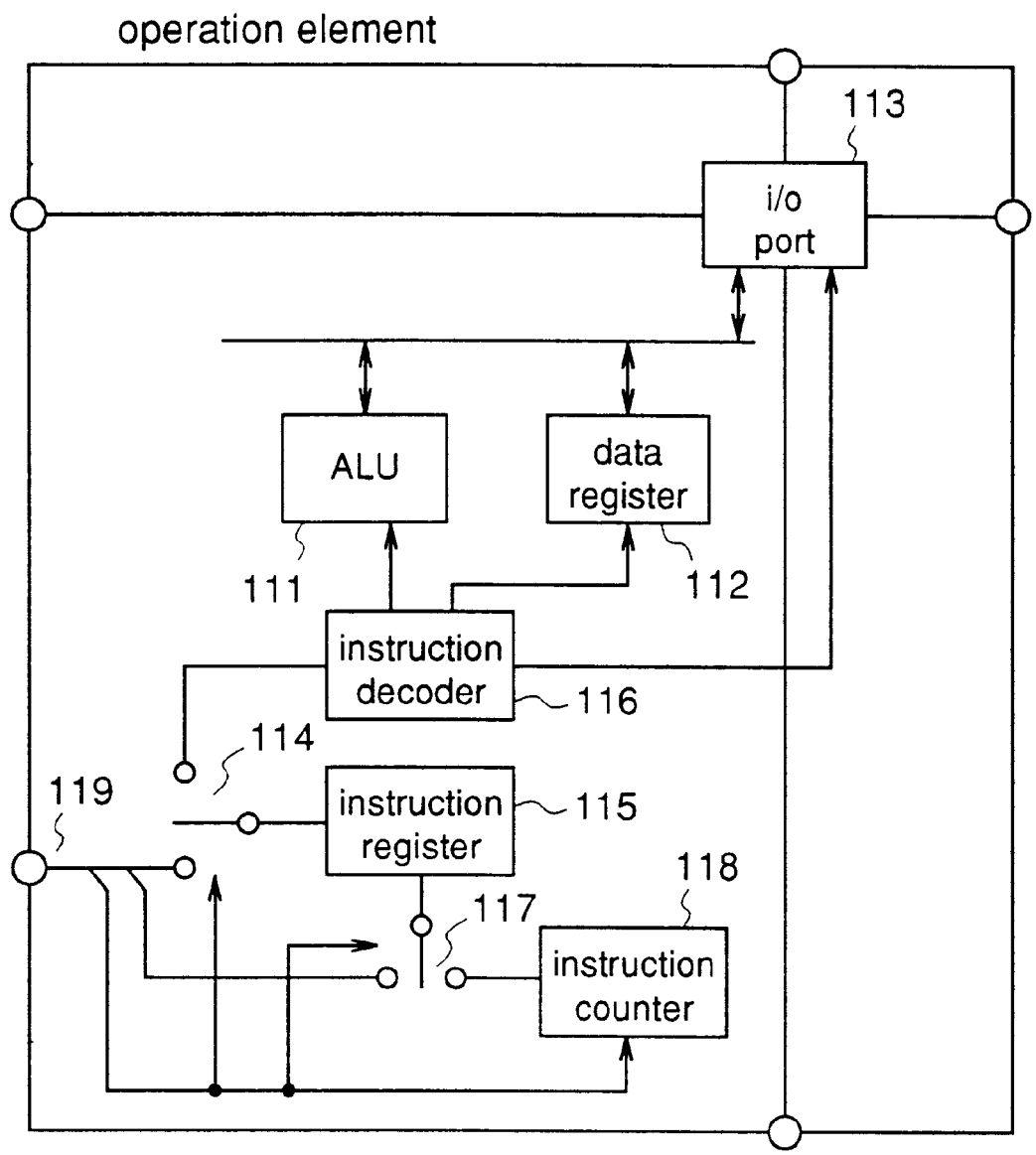
FIG. 3 is a block diagram illustrating an operation element included in the programmable operation circuit shown in FIG. 2.

FIG. 3 is a block diagram illustrating the internal structure of one of the operation elements $PE_{11}$ to $PE_{mn}$. This structure is similar to a general DSP (Digital Signal Processor). That is, the operation element is equipped with an ALU (Arithmetic and Logic Unit) 111, a data register 112 for storing the result of the operation, and an I/O port 113 for exchanging data with external elements. The ALU 111, the data register 112, and the I/O port 113 are controlled by the microprogram.

To load the microprogram into the operation element, the selector circuits 114 and 117 select the microprogram and the write address which are input through the input terminal 119 to the element, whereby the microprogram is loaded into a region shown by the write address in the instruction register 115. The loading of the microprogram is performed during the horizontal flyback period or the vertical flyback period of the video signal, according to the control signal input through the input terminal 119. When the operation is executed during the video period, i.e., when the microprogram stored in the instruction register 115 is used, the selector circuit 117 selects an output signal from an instruction counter 118, and the microprogram is successively read from the instruction register 115 according to a read address generated in the instruction counter 118. The generation of the read address and the readout of the microprogram are controlled by the control signal applied to the input terminal 119. The read microprogram is supplied, through the selector circuit 114, to an instruction decoder 116. The microprogram is decoded in the instruction decoder 116, whereby the ALU 111, the data register 112, and the I/O port 113 are controlled, and a desired operation processing is performed.

FIG. 4 is a table showing allocation of the NTSC decoding process and the MUSE decoding process to the respective operation elements. The NTSC decoding process includes luminance signal/chrominance signal separation, ACC (Automatic Color Correction), color demodulation, filtering, and inverse matrix processing. The MUSE decoding process includes moving picture region interpolation, still picture region interpolation, motion detection, alternated line decoding, and inverse matrix processing. The operation elements, to which the respective processes are assigned, execute the processes to input data flows. Further, since the MUSE decoding process includes inter-frame operation or inter-field operation, frame delay data or field delay data is required. This is implemented by connecting the operation elements, through the I/O ports 136, to the frame memory 101.

RGB signals obtained as a result of the decoding process are output from the output terminals 132a, 132b, and 132c, respectively, and converted into analog signals by the DA converter 120. The analog RGB signals are supplied through the driver circuit 21 to the CRT 22 and displayed as an image.

Figure 5:
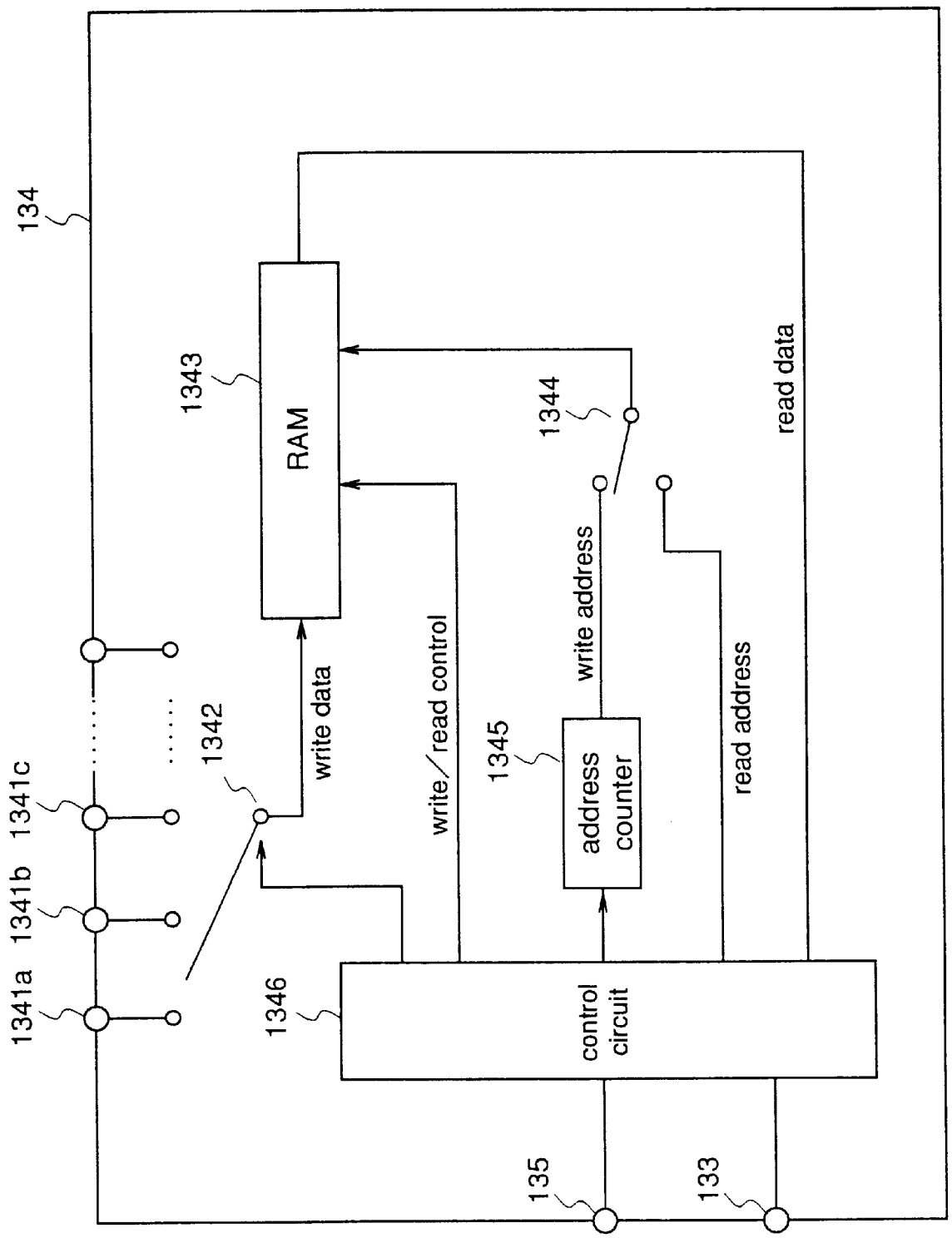
FIG. 5 is a block diagram illustrating a data capture register included in the programmable operation circuit shown in FIG. 2.

Next, the operation of the data capture register 134 shown in FIG. 2 will be described. When the NTSC or MUSE decoding is performed, in addition to the loading of the microprogram showing the steady procedure at the start of the operation, it is necessary to load a microprogram for changing the process content adaptively to the condition of the video signal during the operation. To realize such an adaptive control, it is necessary to capture the video data during the process into the MPU 170. For this purpose, terminals of the network connecting the plural operation elements are connected to the data capture register 134, so that the register 134 can capture both the input signal data and the in-process data, i.e., the data during the decoding process. For example, the data capture register 135 has a circuit structure as shown in FIG. 5. In FIG. 5, reference numerals 1341a, 1341b, 1341c, . . . designate input terminals connected to the network terminals. These input terminals are connected through a selector circuit 1342 to a RAM 1343. An input terminal 135 and an I/O terminal 133 are connected to a control circuit 1346. The control circuit 1346 generates control signals required for selection of a multi-input selector circuit 1342, start of an address counter 1345, writing/reading control of the RAM 1343, and selection of a selector circuit 1344, on the basis of input control signal, address, and data signal. Further, the control circuit 1346 functions as an interface for a read address of the RAM 1343, which address is transmitted through the I/O terminal 133, or for data which is read according to the address.

A description is now given of the operation of the data capture register 134.

First of all, to capture data into the register 134, data selected by the multiinput selector circuit 1342 is input to the RAM 1343. The selector circuit 1344 selects a signal from the address counter 1345. The control circuit 1346 sets the RAM 1343 in the writing operation, and writes the data at an arbitrary timing which is set in advance. With the data writing operation, the address counter 1345 is started, and the data is successively written in an address generated in the address counter 1345.

To transmit the data, the selector circuit 1344 selects the read address supplied from the MPU 170 through the control circuit 1346. Therefore, at a preset timing, the RAM 1343 is set in the reading operation in response to the control signal generated in the control circuit 1346 and, simultaneously, the data written as mentioned above is read out according to the read address supplied through the selector circuit 1344. The read data is transmitted through the I/O terminal 133 and the bus 140 to the MPU 170. In the MPU 170, necessary operation is performed on the basis of the captured data and, according to the result of the operation, a microprogram for changing a part or the whole of the process algorithm is loaded from the ROM 150. In this process, the RAM 160 operates as a temporary storage region for the captured data or a working region required for the operation in the MPU 170.

As described above, the NTSC decoding process includes ACC (Automatic Color Correction). This is to control the gain at color demodulation according to the amplitude of a burst signal. In order to implement this process, a burst signal is captured by the data capture register 134 and transmitted to the MPU 170. In the MPU 170, a correction gain is operated, and a microprogram for realizing the correction gain is loaded to the operation element $PE_{21}$ to which the ACC process is assigned as shown in FIG. 4.

Figure 6:
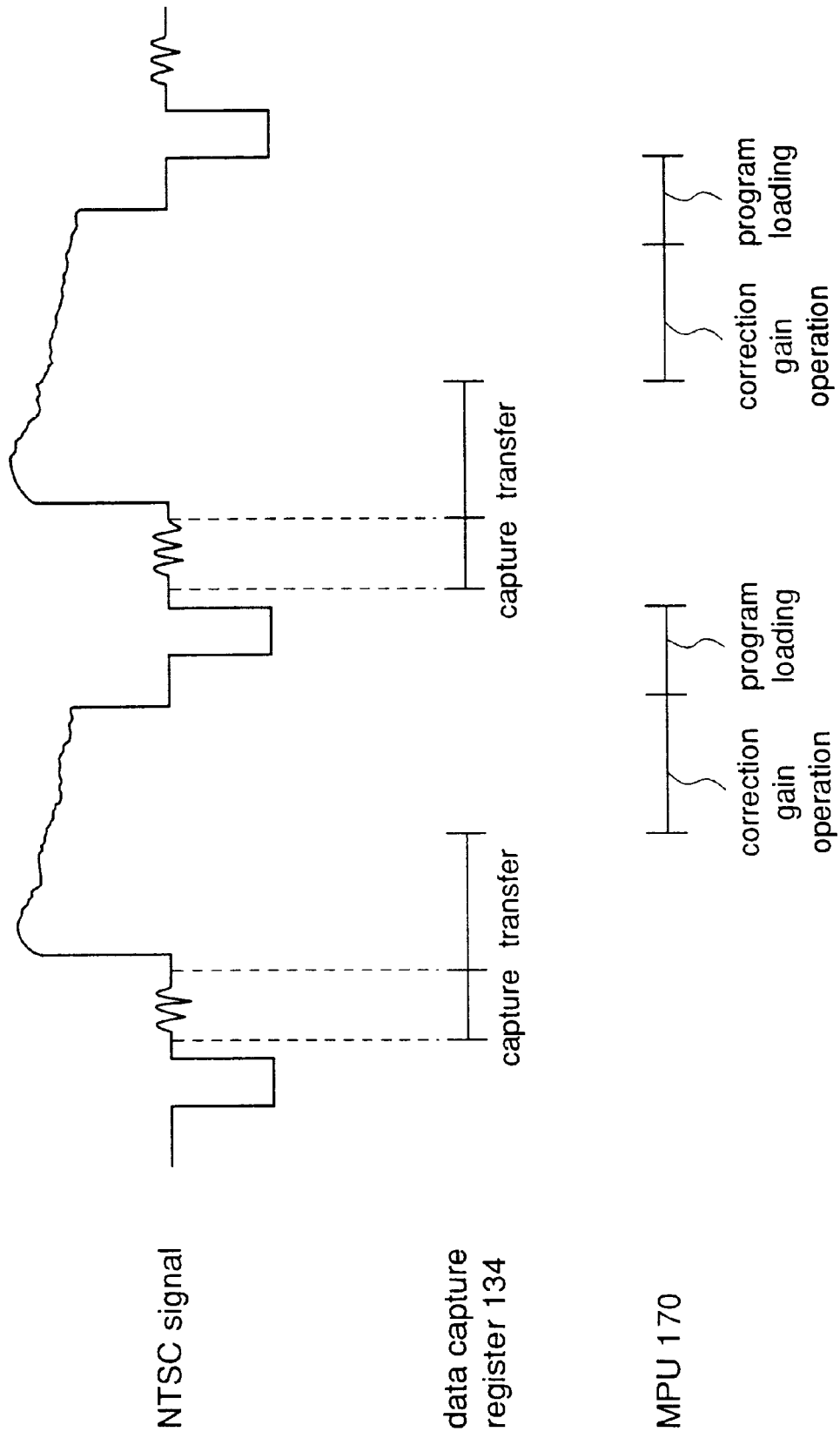
FIG. 6 is a control timing chart in ACC processing.

FIG. 6 shows the control timing when the ACC is performed. The captured burst signal is transferred to the MPU 170 within the line period, and the correction gain is operated in the MPU 170. Further, reloading of the microprogram for realizing the correction gain is completed before starting capture of a burst signal on the next line, and the operation element performs ACC according to the updated instruction.

Figure 7:
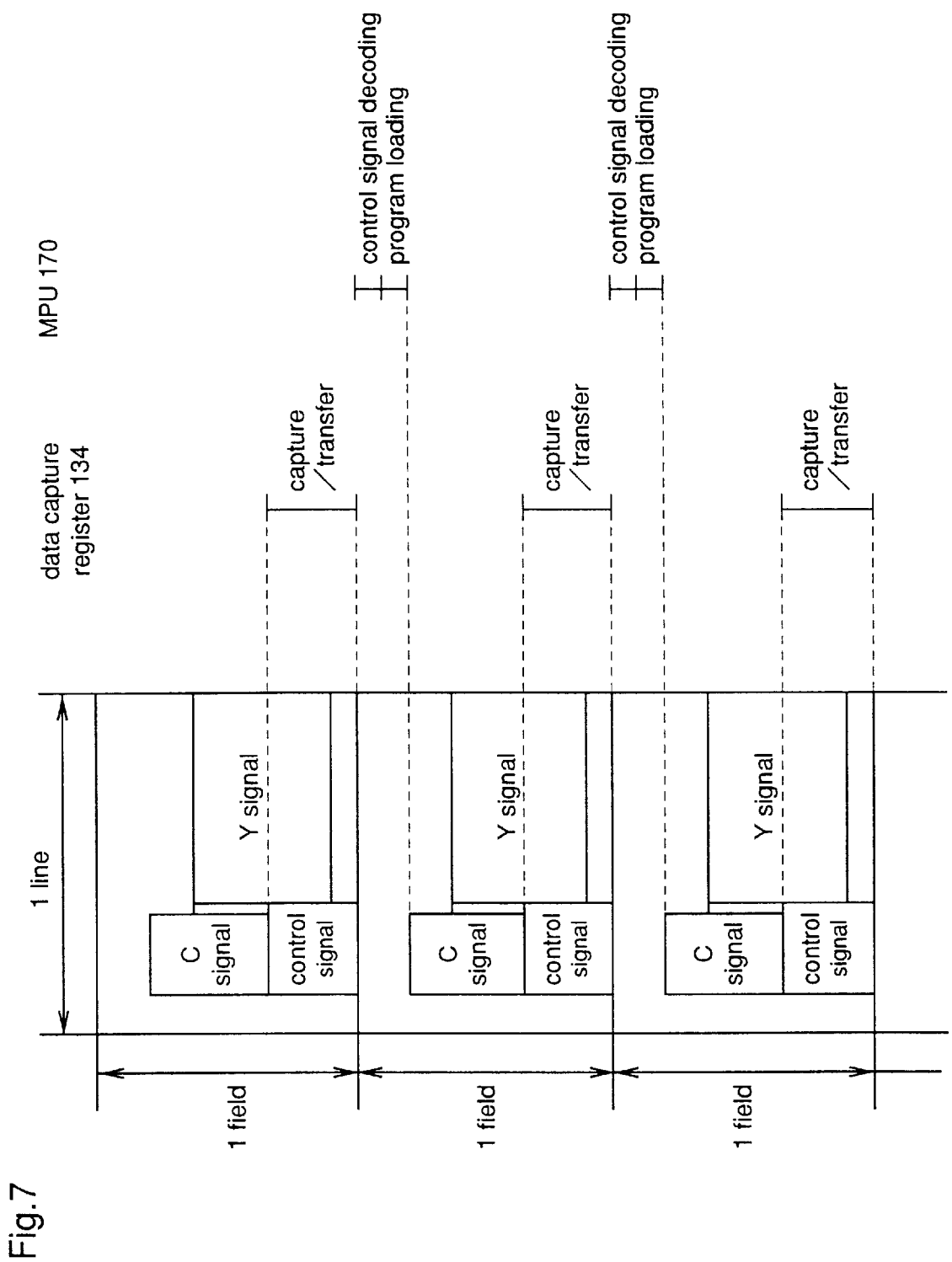
FIG. 7 is a control timing chart by control signals.

FIG. 7 shows the control timing according to control signals in the MUSE decoding process, in comparison with the MUSE signal format. On the MUSE signal, a control signal for setting the operation in each field is superposed. When the MUSE decoding process is performed, it is necessary to change the process content according to the control signal. As shown in FIG. 7, the control signal captured by the data capture register 134 is transferred to the MPU 170 within the field period. In the MPU 170, the control signal is decoded, and a microprogram for realizing the control is loaded during the vertical flyback period of the next field. The operation element operates according to the newly loaded microprogram. In this way, the signal processing unit according to the present invention is flexible to a control processing, such as microprogram change to the operation element.

Next, the synchronous processing will be described.

In the NTSC decoding process, horizontal synchronous detection, vertical synchronous detection, and synchronous clock reproduction are basically performed for each line or field, so that these processes are performed by the MPU 170. That is, the synchronous processing is realized by capturing data required for the processing into the MPU using the data capture function of the programmable operation circuit 130. The synchronous processing circuit 180 shown in FIG. 1 functions as a peripheral circuit for the MPU 170, and generates a control signal according to the result of the operation of the MPU 170. More specifically, the synchronous processing circuit 180 converts phase error data processed in the MPU 170 into a PLL control voltage, and supplies the voltage to a VCXO (not shown). Further, the synchronous processing circuit 180 generates control signals for the programmable operation circuit 130 and the deflection processing circuit 190 on the basis of the reproduced synchronous signal.

Also in the MUSE decoding process, since horizontal synchronous detection, clamp level detection, and ALC (Automatic Level Control) are basically performed for each line or field, these processes are performed in the MPU 170 as in the above-mentioned NTSC decoding process. In this case, the synchronous processing circuit 180 converts the processing data supplied from the MPU 170 through the bus 140 into a clamp level, an ALC control voltage, or a PLL control voltage, and supplies the level or voltage to a clamp circuit, an ALC circuit, or a VCXO (not shown), respectively. Further, the synchronous processing circuit 180 generates control signals for the programmable operation circuit 130 and the deflection processing circuit 190, on the basis of the reproduced synchronous signal.

Next, the deflection processing will be described.

A principal function of the deflection processing is to generate a sawtooth waveform signal for deflection. In this process, it is necessary to remove, in advance, a geometric distortion at the scanning and, for this purpose, pin-cushion correction is performed. The signal processing unit according to the invention is suitable for this process. That is, since this process is performed for each line, the MPU 170 is applicable to this process. The deflection processing circuit 190 shown in FIG. 1 functions as a peripheral circuit for the MPU 170. The deflection processing circuit 190 generates a distortion corrected sawtooth waveform signal on the basis of the correction data operated in the MPU 170 and the synchronous signal from the synchronous processing circuit 180, and controls the CRT 22. In this way, in the signal processing unit according to the present invention, since the MPU 170 implements the principal functions of the synchronous processing and the deflection processing, the signal processing unit can flexibly deal with various signaling systems. In addition, since the function required for the synchronous processing or the deflection processing is a relatively simple function implemented by a peripheral circuit of the MPU, the circuit scale is significantly reduced.

Figure 8:
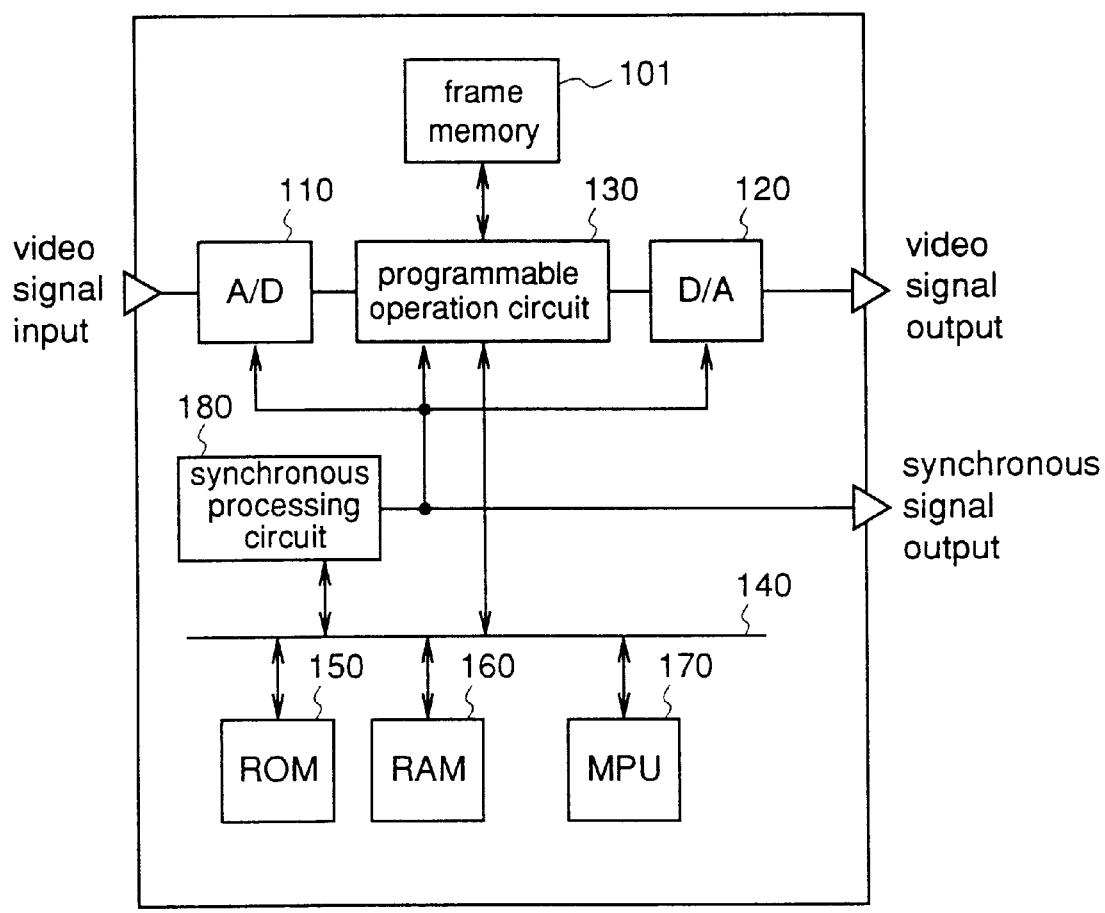
FIG. 8 is a block diagram illustrating a signal processing apparatus according to another embodiment of the present invention.
Figure 9:
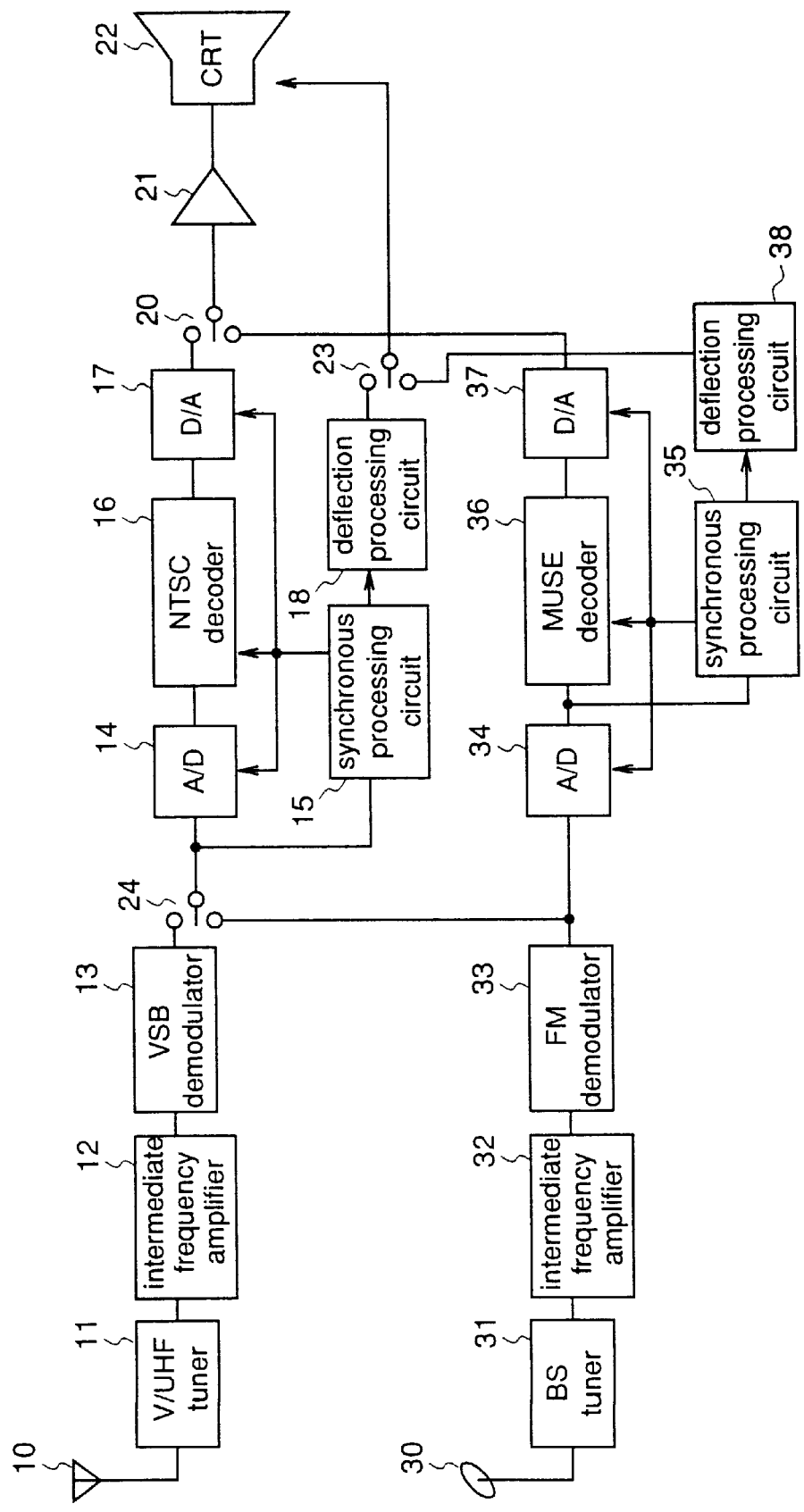
FIG. 9 is a block diagram illustrating a television receiver according to the prior art.

FIG. 8 is a block diagram illustrating a signal processing apparatus similar to the signal processing unit 100 included in the television receiver shown in FIG. 1. The signal processing apparatus shown in FIG. 8 is different from the signal processing unit 100 only in that the deflection processing circuit 190 is omitted. Although in the foregoing description emphasis has been placed upon a television receiver, the signal processing apparatus shown in FIG. 8 can be applied to devices other than television receivers. In this case, the deflection processing circuit 190 is dispensed with because it is required only when a CRT is employed as a display unit in a television receiver.

For example, the signal processing apparatus shown in FIG. 8 is applicable to a wide-screen projection display system. In recent years, wide-screen projection display systems have been increasingly established in, for example, public facilities. This system is fundamentally constructed by combining a projection display unit and plural signal reproduction units as many as signal systems to be displayed. Therefore, the signal processing apparatus shown in FIG. 8 is suitable for the signal reproduction unit in the wide-screen projection display system.

As described above, in the television receiver and the signal processing apparatus according to the present invention, high speed processing, such as the NTSC decoding or the MUSE decoding, are executed by the programmable operation circuit, and low speed processing, such as the control processing to change the microprogram for the operation element, the synchronous processing, and the deflection processing, are executed in the software process using the MPU. Therefore, the television receiver and the signal processing apparatus can flexibly deal with various video signals. In addition, since the principal functions required for the low speed processing are realized by the MPU, the circuit scale is significantly reduced, resulting in a considerable cost reduction.

While in the present invention an MIMD (Multiple Instruction stream Multiple Data stream) operation circuit is employed as the programmable operation circuit 130, other programmable operation circuits, such as an SIMD (Single Instruction stream multiple Data stream) operation circuit, may be employed as long as it can perform high speed processing, such as video signal decoding.

What is claimed is:

1. A television receiver comprising:
    a memory containing a microprogram that specifies a video decoding process algorithm;
    a programmable operation means receiving a video signal and executing the video decoding process according to the microprogram;
    a microprocessor unit controlling transmission of the microprogram contained in the memory to the programmable operation means;
    wherein a high speed processing is performed using the programmable operation means while a low speed processing is performed using the microprocess unit; and
    said programmable operation means comprises an arithmetic and logic unit connected with said memory via an instruction decoder, a data register connected with said arithmetic and logic unit, and an I/O port connected with said data register, said arithmetic and logic unit, and I/O port being controlled by said microprogram to perform a desired operation processing.

2. A video signal processing apparatus comprising:

a memory containing a microprogram that specifies a video decoding process algorithm;

a programmable operation means receiving a video signal and executing the video decoding process according to the microprogram; and a microprocessor unit controlling transmission of the microprogram contained in the memory to the programmable operation means;

wherein a high speed processing is performed using the programmable operation means while a low speed processing is performed using the microprocessor unit; and said programmable operation means comprises an arithmetic and logic unit connected with said memory via an instruction decoder, a data register connected with said arithmetic and logic unit, and an I/O port connected with said data register, said arithmetic and logic unit, said data register, and said I/O port being controlled by said microprogram to perform a desired operation processing.

3. A television receiver as defined in claim 1 wherein the high speed processing using the programmable operation means includes video signal processing, and the low speed processing using the microprocessor unit includes one of control processing, synchronous processing, and deflection processing.

4. A television receiver as defined in claim 1 wherein a cathode ray tube is used as a display unit, and the low speed processing using the microprocessor unit includes deflection processing.

5. A television receiver as defined in claim 11, further comprising:

information extraction means extracts information included in the video signal;

wherein the microprocessor unit transfers a microprogram for changing a part or the whole of the process algorithm, from the memory to the programmable operation means, according to the information extracted by the information extraction means.

6. A video signal processing apparatus as defined in claim 2 wherein the high speed processing using the programmable operation means includes video signal processing, and the low speed processing using the microprocessor unit includes one of control processing, synchronous processing, and deflection processing.

7. A video signal processing apparatus as defined in claim 2 wherein a cathode ray tube is used as a display unit, and the low speed processing using the microprocessor unit includes deflection processing.

8. A video signal processing apparatus as defined in claim 2, further comprising:

information extraction means extracts information included in the video signal;

wherein the microprocessor unit transfers a microprogram for changing a part or the whole of the process algorithm, from the memory to the programmable operation means, according to the information extracted by the information extraction means.

\* \* \* \* \*